United States Patent [19]
Waters, Jr.

[11] 3,729,850
[45] May 1, 1973

[54] FISHING LURE

[76] Inventor: John E. Waters, Jr., 1620 West Collins, Orange, Calif. 92667

[22] Filed: Mar. 15, 1971

[21] Appl. No.: 124,112

[52] U.S. Cl. ............. 43/42.37, 43/42.39, 43/42.47, 43/44.81
[51] Int. Cl. .............................................. A01k 85/00
[58] Field of Search................... 43/42.37, 42.39, 43/42.47, 44.81

[56] References Cited

UNITED STATES PATENTS

| | | | |
|---|---|---|---|
| 3,121,291 | 2/1964 | Iffland, Jr. et al. | 43/44.81 |
| 1,495,832 | 5/1924 | Aiken | 43/42.47 X |
| 2,765,572 | 10/1956 | Woolfe | 43/42.39 X |
| 2,989,817 | 6/1961 | Kepler | 43/44.81 X |
| 2,589,007 | 3/1952 | Landon | 43/42.39 X |
| 958,233 | 5/1910 | Curtiss | 43/42.37 X |
| 3,017,307 | 1/1962 | Halliburton | 43/44.81 X |
| 2,017,333 | 10/1935 | Zuck | 43/42.47 X |
| 1,522,450 | 1/1925 | Hayes | 43/42.27 X |
| 3,212,209 | 10/1965 | Irvin | 43/42.37 X |
| 1,480,707 | 1/1924 | Edwards | 43/42.37 |

Primary Examiner—Joseph S. Reich
Attorney—Nienow & Frater

[57] ABSTRACT

A fishing lure of the jig class in which the jig body is weighted, which includes a resilient vane arranged uprightly in a transverse plane behind the jig body and forwardly of the barb, and in which the fishing line attachment point lies above the center of gravity of the lure approximately over its center of gravity to the end that the lure exhibits oscillatory motion rotationally about the hook shank as the lure is drawn through the water. A number of constructional features account for that kind of motion over a wide range of lure velocities. These features include the use of a jig body which is circular in cross-section, a design which is symmetrical about a vertical midplane and the use of prescribed dimensional ratios in the several parts.

10 Claims, 7 Drawing Figures

Patented May 1, 1973 3,729,850

INVENTOR.
JOHN E. WATERS JR.
BY
Nienow & Frater
ATTORNEYS

FISHING LURE

This invention relates to improvements in artificial fishing lures and it relates particularly to improvements in the class of lures that is identified by the name "jig".

Jigs are fishing lures that employ a barbed hook and a shank which extends rearwardly from the barb and is bent through 180° so that the shank extends forwardly of the barb. At its forward end the shank is attached to an enlarged body portion. The lure is drawn through the water by a line which is attached to a fastener at some point on the body portion of the jig. The jig is further distinguished in that it is usually provided with a plurality of flexible streamer elements which extend rearwardly from the body portion of the lure to a point near the rearward end of the hook in most cases well beyond that point. The streamers are often made of feathers or plastic strips although other materials may be employed. It is common to add a chenille material in back of the body portion of the lure where it encompasses the shank of the hook. Cotton and plastics are popular as chenille materials.

As a class, jigs have proven to be successful lures. They are used by pulling them through the water by trolling or by reeling after having been cast or otherwise placed away from the fisherman. Experimentation with means for imparting additional degrees of motion to the jig have resulted in the discovery that certain species of fish are especially attracted to certain kinds of jig motion. While the response to motion varies from one locale to another, it has been adequately demonstrated that a lure that undergoes one kind of movement is often substantially more successful in attracting one species of fish at a given time or place than motion of another kind. As a consequence, lures have been developed which have certain characteristic and motions. Some lures are made to spin, others are arranged so that spinning is prevented. Some lures wriggle from side to side. Others tend to wriggle up and down.

One object of the invention is to provide a lure whose "action" when drawn through water is the same over a wide range of velocities. Moreover, it is an object of the invention to provide an improved lure of the jig class which tends to move through the water so that the hook is drawn relatively straight in the direction which it is being pulled and whose shaft tends to remain horizontal as the lure is being drawn through the water. In addition, it is an object to provide a lure which tends to oscillate through an angle about the axis of the shaft of the hook. The degree in which a particular kind of motion is realized depends in part upon the speed at which the lure is drawn through the water. The kind of action described above has proven to be desirable when the lure is drawn through the water at speeds of between three and ten feet per second and lures made according to the invention tend to provide that result. Achieving that result is an object of the invention.

Whatever their motion, experience has demonstrated that lures made according to the invention sometimes are more successful than other kinds of jigs in catching trout and bass in the fresh waters of California and in the salt waters adjacent the coast of California. An object of the invention is to provide a lure which is attractive to trout and to salt water and fresh water bass and other game fish.

Other objects and advantages of the invention will be apparent upon examination of the accompanying specification and the accompanying drawings, in which.

Lures made according to the invention include a fish hook which includes a forwardly extending barb at the end of a shank that extends rearwardly from the barb and is bent through an angle of about 180° and then forwardly of the barb to a forward end. The jig body is mounted on the forward end of the shank and is weighted in the sense that it will not float. A line fastener is connected to the lure at a point above and substantially over its center of gravity. When in use the lure will hang so that the line fastener is vertically above the center of gravity. Thus, the terms "above" and "upwardly" means inwardly vertically upward when the lure is in use and, according to convention, toward the top of the accompanying drawing. It also includes a vane which extends upwardly in a plane which is substantially perpendicular to the axis of the shank and which is located rearwardly of the center of gravity of the lure and forwardly of the barb. The vane is made of resilient material and the fact that it extends upwardly and is located behind the center of gravity and that it is resilient, accounts for a particular kind of oscillatory motion when drawn through the water from a point above its center of gravity and substantially over the center of gravity of the lure. Other features including the shape of the body, the shape and arrangement of the vane, the symmetry of the unit and particularly the symmetry of its body and vane, account for refinements in that basic motion.

Figure 1:
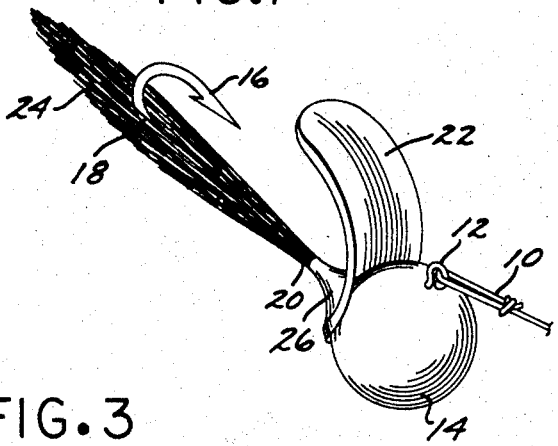
FIG. 1 is a perspective view of a fishing lure embodying the invention illustrating its appearance while being drawn through water.

In preferred form, the barb is located above the shank in the vertical midplane. This arrangement is illustrated in the embodiment of FIGS. 1 through 6 and also in the embodiment of FIG. 7. The lure is shown in FIG. 1 in one of the states it assumes when being drawn through the water in the direction indicated by the direction of the line attachment clip 10. The clip is attached to a fastening device 12 which is fixed to the body portion 14 of the lure. Portion 14 is called the "weight" because it has sufficient density to prevent the assembly from floating. The lure is being drawn in what is called the forward direction. The barb 16 of the hook 18 points in that forward direction. The shank of the hook begins at barb 16 and bends down through a half circle and around to a forward part 20. The weight 14 is connected to that forward part of the shank. The shank extends through the vane 22 and into the weight 14.

The lure shown includes a number of marabou stork feathers 24 which are attached to the shank in its forward region just behind the weight 14. At this point a body 26, which may be formed of binding material, adhesive, and a retaining washer, is disposed upon the shank 20 against the rear of the vane 22 in fixed position on the shank.

Figure 2:
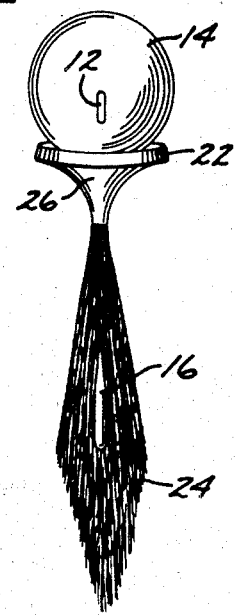
FIG. 2 is a top plan view of the lure of FIG. 1 shown in the dry condition.
Figure 3:
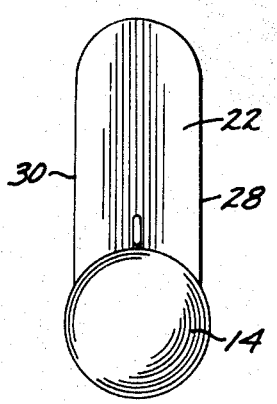
FIG. 3 is a view in front elevation of the dry jig shown in FIG. 2.
Figure 4:
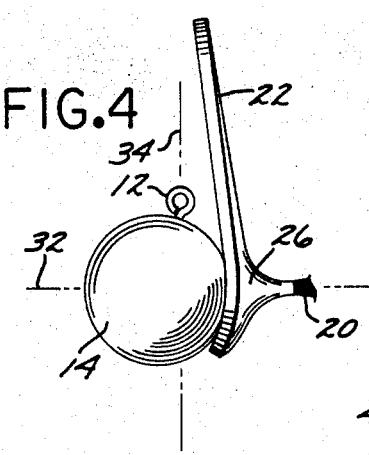
FIGS. 4 and 5 are partial views in side elevation and in bottom elevation, respectively, of the forward portion of the jig shown in FIGS. 1, 2 and 3.

As best shown in FIGS. 3 and 4, the vane 22 extends upwardly substantially in a plane adjacent the rear surface of the weight 14. In this embodiment, the vane is very slightly dished forwardly and upwardly in the manner of a very shallow scoop and the body 26 tends to bias the vane so that it will tend to retain this scoop shape. Thus, the outer edges 28 and 30 of the vane extend forward slightly more than does the vertical center region of the vane. This is best shown in the side elevation of FIG. 4 and the top elevation in FIG. 2.

The vane in both embodiments illustrated in the drawings is made of flat material of substantially uniform thickness. The scoop-shape effect is accomplished in the modification shown in FIGS. 4 and 5 by the washer and body of material 26 by which the vane is attached to the hook shank 20. The rear face of the weight 14 is spherical and the body of material 26 forces the vane to assume a corresponding spherical shape. This arrangement ensures that the opposition to bending that is exhibited by the vane 22 is progressively greater from the upper end of the vane toward its attachment to the ball weight 14.

When the lure is drawn through the water is oscillates, but ordinarily does not rotate, about the axis of the shank 20. That axis is marked by line 32 in FIGS. 4 and 5. The vane is resilient so that it will bend backward as it is drawn through the water and to that extent it serves to protect the barb from being fouled in weeds. Because of this backward bending it presents a variable area, in front elevation, so that the opposition that it presents to forward motion tends to be uniform despite changes in the speed at which the lure is drawn through the water. The fact that flexibility provides these two effects is an important feature of the invention. Moreover, jigs made according to the invention ride much higher in the water at a given speed than do conventional jigs. Thus, they are especially useful in shallow water where they make a slower return feasible.

The variable area effect of the vane is an important one because it is desired to control the direction in the vertical plane in which the shaft 20 points as the lure is drawn through the water. In FIG. 4, the vertical line 34 extends through the center of gravity of the lure. That center of gravity occurs at the intersection of the center line 32 and the center line 34. While the center of gravity lies substantially on the axis of the shaft 20 and the horizontal midplane through the weight 14, the center of gravity is behind the vertical transverse midplane through the weight because of the added weight of the hook and the vane. The fastening member 12 is fixed to the weight at a position above the center of gravity but substantially over the center of gravity. The fishing line by which it is drawn through the water is attached directly, or through coupling elements, to the fastener 12. The fishing line extends forwardly and upwardly from the lure. Pulling the lure from a point above its center of gravity results in a force couple that tends to rotate it and to lift the rear portion of the shank 20 above the horizontal plane. The tendency to rotate in that fashion depends more on the position of the fastening element that the speed with which it is drawn through the water. The vane 22 has its primary purpose the introduction of oscillatory motion around the axis of shaft 20. However, it projects upwardly so that it does present an opposition to forward motion of the lure. That opposition is not directly variable with the speed of lure movement because the vane bends in response to that opposition and presents a smaller surface to oppose forward motion. Consequently, the vane presents a relatively uniform opposition to the tendency of the lure to move through an arc as an incident to the placement of fastener 12 whereby the lure is drawn through the water with the shank 20 much more nearly horizontal than would otherwise be true.

The vane 22 is advantageously formed of a material which exhibits resilience no matter in which dimension it is deformed. However, it is essential only that it exhibit opposition to backward bending. A vane that can twist about its vertical center line exhibits somewhat less propensity for sidewise excursion. While the degree of any twisting is too small for unenhanced visual observation at practical pull velocities, it is theorized that when drawn through the water, any imbalance in the forces applied to the vane may result in its being twisted to one side or the other. Having been twisted, the vane operates as a rudder tending to rotate the lure about the axis 32 of the shank. But when the lure has rotated to carry the fastener 12 to one side of the vertical center plane, the force of the line pulling on the lure tends to pull it back. That result in imbalance on the vane in an opposite direction which tends to twist it to the other side. Thereafter, the vane, acting as a rudder, causes the lure to rotate about the axis 32 to the opposite side until the fastener 12 has preceded to a point where the tension on the line results in another reversal of the imbalance. In this manner, the lure is made, it appears, to oscillate from side to side, primarily by arcuate movement of the lure about the shank axis as the lure is towed or is retrieved by the fisherman. To combine that motion with excursions the vane is made so that it will readily bend rearwardly while opposing twisting.

Figure 5:
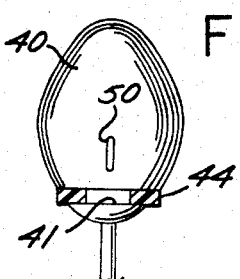

While it is possible to compensate for an unsymmetrical arrangement, when it is desired to minimize sidewise or vertical excursions of the lure as it is being drawn through the water, the structure is advantageously made symmetrical. It is most important that the unit be symmetrical about the vertical center plane and the use of a weight that is circular in transverse cross-section ensures an adequate symmetry. As seen in FIG. 3, one half of the frontal area of the lure is disposed substantially both above and below the level of the fastener 12, It has been found that it is helpful to limit the width of the vane, the dimension from edge 28 to 30, so that it is no wider than the width of the body or weight 14. That this feature is incorporated in the embodiment of FIGS. 1 through 5 is illustrated in FIGS. 2, 3 and 5. In this embodiment, the symmetry is aided by the fact that the weight 14 is generally spherical in form and this is a preferred shape.

Figure 6:
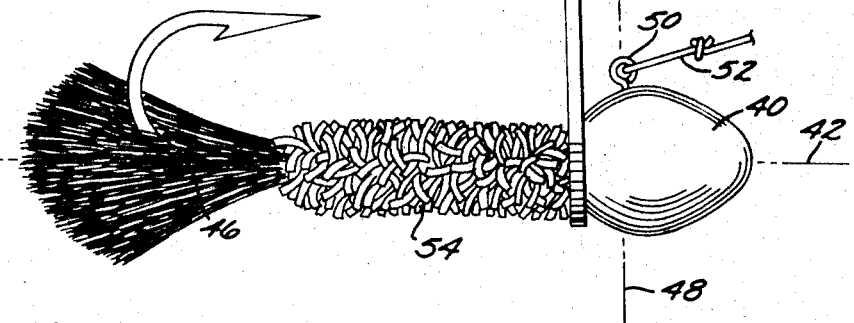
FIG. 6 is a view in side elevation of an alternative form of lure embodying the invention.
Figure 7:
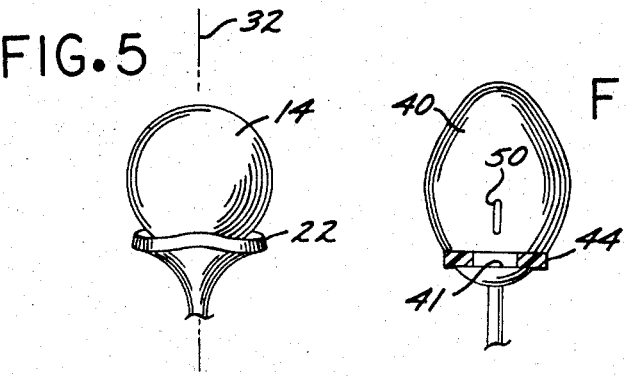
FIG. 7 is a partial view in top elevation of the body part of the lure of FIG. 6 including a fraction of the hook and with the vane shown sectioned on the horizontal midplane of the body.

The embodiment illustrated in FIG. 6 employs a weight 40 which is symmetrical about its lengthwise center line 42. In this embodiment, the weight has the shape of an oblate spheroid. Its vane 44 is not scooped but is perfectly flat when relaxed. It is assembled on the body or weight 40 so that it lies in a groove 41 that encircles the weight as shown in FIG. 7. It lies in a plane transverse to the center line 42 of the weight 40 and shank 46 and its plane is behind the line 48 which extends through the center of gravity of the unit and which contains a fastening device 50 to which a pull clip 52 is affixed. An oblate spheroid is used in this case primarily to add a greater weight at the forward end of the lure to compensate for the addition of a chenille material 54 to the shank rearwardly of the vane 44. Use of the spheroid rather than a larger sphere or repositioning of the fastener, adds that additional weight in the forward part of the lure so that the fastener 50 need not be elevated unduly above the center line and so that the spacing between the fastener 50 and the vane 44 is sufficiently large to enable the fisherman to work with the fastener 50 without undue inconvenience. Like the vane 22 of the embodiment of FIGS. 1 through 5, vane 44 is oval-shaped. In fact it is elliptical in this embodiment and this arrangement ensures that the degree of resiliency of the vane is less at its upper end than it is toward its center. This feature, while it results in a stiffness against extreme deflection at higher pull velocities and a change in the degree of opposition to the pull, it does tend to stabilize the movement of the lure at those higher draw speeds.

In the smaller sizes suitable for fresh water and coastal fishing it has been found desirable to use a lead weight as the body. The diameter of that body is advantageously a little less than the diameter of the hook bend and the vane length is advantageously about two and one-half times (between two and three times) the body height.

Although I have shown and described certain specific embodiments of my invention, I am fully aware that many modifications thereof are possible. My invention, therefore, is not to be restricted except insofar as is necessitated by the prior art.

I claim:

1. An artificial fishing lure of the jig class, comprising:

a fish hook comprising a forwardly extending barb at the rear end of a shank bent around and then forwardly of the barb to a forward end;

a weight carried on the forward end of the shank;

a vane of resilient material disposed, when relaxed, in a plane substantially perpendicular to the axis of the shank between the center of gravity of the lure and the barb and extending to one side of the shank; and a line fastener connected to the lure and disposed on the same side of the lure to which said vane extends substantially in the plane perpendicular to the shank which contains the center of gravity of the lure.

2. The lure defined in claim 1 in which the lure is substantially symmetrical about the plane containing the axis of the shank and the fastener.

3. The lure defined in claim 2 in which the area of the lure seen in front elevation when the vane is relaxed is approximately half above and half below the level of said fastener.

4. The lure defined in claim 3 in which the weight is substantially circular in planes perpendicular to the axis of the forward position of said shaft.

5. The lure defined in claim 4 in which the weight is substantially spherical.

6. The lure defined in claim 4 in which the weight is substantially as oblate spheroid.

7. The lure defined in claim 4 in which said vane is oval-shaped and has a width approaching the diameter of said weight.

8. The lure defined in claim 1 in which said vane is formed of a material which exhibits resilience when twisted about its vertical centerline and when its free end is bent rearwardly toward the barb.

9. The lure defined in claim 8 in which said vane comprises sheet material of substantially uniform thickness and extends from the weight a distance approximating two and one-half times its width.

10. The lure defined in claim 8 including means for biasing the vane to scoop shape whereby said lure proceeds, when drawn through water at a speed between three and six feet per second, with its shaft axis level and pointed in the pull direction while oscillating arcuately about the shaft axis.

* * * * *